(12) United States Patent
Garlichs et al.

(10) Patent No.: US 8,469,647 B2
(45) Date of Patent: Jun. 25, 2013

(54) BOOK BINDING MACHINE

(75) Inventors: Jürgen Garlichs, Rahden (DE); Christian Heiner Müller, Lübbecke (DE); Andreas Walther, Stadthagen (DE)

(73) Assignee: Kolbus GmbH & Co. KG, Rahden (DE)

( * ) Notice: Subject to any disclaimer, the term of this patent is extended or adjusted under 35 U.S.C. 154(b) by 731 days.

(21) Appl. No.: 12/657,511

(22) Filed: Jan. 22, 2010

(65) Prior Publication Data

US 2010/0215459 A1 Aug. 26, 2010

(30) Foreign Application Priority Data

Feb. 23, 2009 (DE) .......................... 10 2009 010 191

(51) Int. Cl.
*B42C 19/00* (2006.01)
*B42B 5/00* (2006.01)

(52) U.S. Cl.
USPC ............................................ 412/10; 198/644

(58) Field of Classification Search
USPC ...... 198/434, 435, 464.3, 644, 788, 813–816, 198/832, 832.1, 834, 835; 412/1, 9, 22, 10
See application file for complete search history.

(56) References Cited

U.S. PATENT DOCUMENTS

| 6,354,582 | B1 | 3/2002 | Hafer et al. | |
|---|---|---|---|---|
| 7,210,887 | B2 * | 5/2007 | Engert et al. | ..................... 412/33 |
| 7,721,872 | B2 * | 5/2010 | Aoyama et al. | ............ 198/474.1 |
| 8,123,450 | B2 * | 2/2012 | Muller | ............................ 412/22 |

FOREIGN PATENT DOCUMENTS

| DE | 198 46 525 A1 | 4/2000 | |
|---|---|---|---|
| DE | 102 21 542 A1 | 11/2003 | |
| DE | 20 2008 001 353 U1 | 5/2008 | |
| DE | 10 2006 062 530 A1 | 7/2008 | |
| GB | 2189757 | * 11/1987 | ..................... 104/196 |
| GB | 2189757 A | * 11/1987 | ..................... 104/196 |

OTHER PUBLICATIONS

European Search Report EP 09 00 1435, dated May 12, 2009.
German Search Report, 10 2009 010 191.8, dated Mar. 28, 2012.

* cited by examiner

*Primary Examiner* — Dana Ross
*Assistant Examiner* — Mohammad Nourbakhsh
(74) *Attorney, Agent, or Firm* — Alix, Yale & Ristas, LLP

(57) ABSTRACT

A book binding machine for processing book blocks (3) features a transport system (2) with a plurality of book block clamps (40) for receiving the book blocks (3) that can be continuously moved along a closed circulation path and are coupled to a traction mechanism (63), wherein the traction mechanism (63) revolves around a driving wheel (55) and a deflection wheel and is tensioned by means of a tensioning device. Processing stations (70, 80) are arranged in the region of straight sections of the circulation path. The driving wheel (55) is driven by a gearless, rotative electric direct drive (50), wherein a first rotating component (53) of the rotative direct drive (50) is mounted or realized directly on the driving wheel (55).

21 Claims, 2 Drawing Sheets

BOOK BINDING MACHINE

BACKGROUND

The present invention pertains to a book binding machine for processing book blocks with a transport system that features a plurality of book block clamps for receiving the book blocks that can be continuously moved along a closed circulation path and are coupled to a traction mechanism, wherein the traction mechanism revolves around a driving wheel and a deflection wheel and is tensioned by means of a tensioning device, and wherein processing stations are arranged in the region of straight sections of the circulation path.

A book binding machine of this design in the form of a so-called perfect binding machine is described, for example, in DE 198 46 525 A1. In this case, book blocks that are loosely gathered from sheets and/or folded sections are transported in the book block clamps of the transport system with a defined overhang and connected into a book block by applying glue on the processed book block spine. A cover feeding and pressing device connects an optionally grooved cover to the book blocks, wherein the cover is pressed against the book block spine, as well as adjacent lateral regions, during the continuous movement of the book blocks.

The drive of the traction mechanism with the book block clamps is realized with a driving motor that is placed on the bottom of the frame such that its output shaft is aligned horizontally, wherein this driving motor is connected to the driving wheel of the transport system by means of different driving elements with inherent play and elasticity, such as transmission gears and angular gears, shafts, belts and/or chains, and also drives various processing stations including the infeed and delivery devices via a main shaft that longitudinally extends in the perfect binding machine.

Due to the transverse connections with the book block clamps guided along the circulation path, the traction mechanism needs to be tensioned by displacing the deflection wheel or the driving wheel longitudinally referred to the straight sections of the circulation path. Due to the drive train leading to the driving wheel, the tensioning process is realized with the non-driven deflection wheel in known perfect binding systems and therefore limits the design options with respect to the arrangement of the driving and deflection wheels relative to the circulation path and assigned processing stations.

With respect to the quality of individual processing steps, it is important that the book block clamps are situated in defined positions at certain times. However, the traction mechanism that consists, for example, of a chain in connection with the elasticity of the drive train between the driving motor and the traction mechanism forms an oscillatory system, wherein the high mass of the traction mechanism with the book block clamps causes this oscillatory system to have low resonant frequencies that can be stimulated by interfering influences occurring periodically with the machine cycle. Consequently, positional errors that vary from book block clamp to book block clamp occur at the respective locations during the oscillation of the traction mechanism, wherein these positional errors can no longer be completely compensated with corresponding countermeasures in the processing stations. The oscillations of the traction mechanism result in higher driving torques on the traction mechanism drive that reduce the service life of the traction mechanism.

A book binding machine of the above-described design is known from DE 102 21 542 A1, wherein the transport system of the book block clamps and at least one processing station can be driven independently of one another in this book binding machine. In order to control this processing station in the sense of a positioning task, a measuring system for determining the position of the respective book block clamp or book blocks is provided in the vicinity of this processing station. The complete drive system is divided into partial systems that are less susceptible to oscillations and the various processing tasks can be carried out much more accurately due to the position measurement in the region of the processing station. However, an elastic drive train still exists between the driving motor and the driving wheel of the traction mechanism.

SUMMARY

The invention is based on the objective of developing a book binding machine of the type summarized above, in which the transport system has a simple construction and the drive for the book block clamps is largely rigid and free of play.

This objective is attained in that the driving wheel is driven by a gearless, rotative electric direct drive, wherein a first rotating component of the rotative direct drive is mounted or realized directly on the driving wheel. Due to the total elimination of transmission elements with inherent elasticity, the driving wheel for the traction mechanism is not oscillatory relative to the motor axle and absolutely free of play. The driving wheel itself quasi provides the driving torque for the drive of the traction mechanism. The absolutely rigid connection between the driving motor and the mass of the traction mechanism with the book block clamps makes it possible to optimize the operation of the driving motor controller with respect to interferences and to thusly react to interfering influences (e.g., caused by processing forces) in a more direct fashion. The position of the respective book block clamp can be directly determined from the position of the motor axle. Irregularities of individual processes (e.g., during the milling of the book block spine) can be determined based on possibly occurring fluctuations of the driving torque to be generated by the direct drive. The direct connection of the drive to the main mass of the traction mechanism with the book block clamps to be moved also results in a safety-relevant advantage because an overload in the clamp chain can be detected sooner. The construction of the transport system is significantly simplified due to the elimination of the complete drive train. The installation space made available due to the elimination of the drive train can be used for processing stations or auxiliary modules.

According to an additional development of the invention, it is proposed that the driving wheel is accommodated in a bearing block of the tensioning device that can be displaced and fixed relative to the frame and features at least one end plate or an axle receptacle. The drive and the tensioning device are integrated into one unit and act upon the same deflection wheel. This provides a variety of design options, particularly with respect to the arrangement of the driving wheels and deflection wheels on the transport system. The required structural space is simultaneously reduced and the other non-driven deflection wheel can be supported in a simple frame construction.

According to an additional development of the invention, it is proposed that the rotative direct drive is arranged above the driving wheel. This provides superior accessibility and prevents soiling of the direct drive with precipitating paper dust.

The rotative direct drive is preferably arranged between the driving wheel and the end plate or the axle receptacle. This allows a particularly rigid construction of the support for the driving wheel and of the drive train between the direct drive and the driving wheel. A particularly compact design is achieved if a second, stationary component of the rotative direct drive is mounted or realized on the end plate or the axle receptacle in accordance with an additional development. It is furthermore proposed that the end plate or the axle receptacle is arranged in a detachable fashion in order to realize an access opening in the axial direction of the direct drive. This provides adequate accessibility for mounting/dismounting and for inspecting the direct drive.

The driving wheel preferably is rotatably supported on a stationary axle. This makes it possible to realize a constructively simple yet rigid support of the driving wheel.

The first rotating component of the rotative direct drive is preferably fitted with permanent magnets. The lines required for the power supply and the position feedback therefore are not situated on the rotating component, but rather on the stationary second component of the direct drive.

According to an additional development, it is proposed that at least one processing station is also driven by means of said driving wheel via driving means. The drive train originates at the driving wheel that makes it possible to directly determine the position of the respective book block clamp. Position-dependent processing steps such as, e.g., the application of a cover therefore can be carried out in a highly accurate fashion. Said driving wheel is preferably connected to a main shaft that makes it possible to drive several processing stations, e.g., the infeed and delivery devices. The main shaft is driven by the driving wheel and no longer drives the driving wheel as it was the case until now.

The driving wheel is preferably arranged in the region of the cover feeding and pressing device. The cover and the book block are combined exactly at the time, at which the book block clamp leaves the driving wheel. Possibly occurring tolerances in the traction mechanism therefore cannot affect the alignment of supplied covers relative to the book blocks.

One exemplary embodiment of an inventive book binding machine is described in detail below with reference to the attached figure.

DETAILED DESCRIPTION

Figure 1:
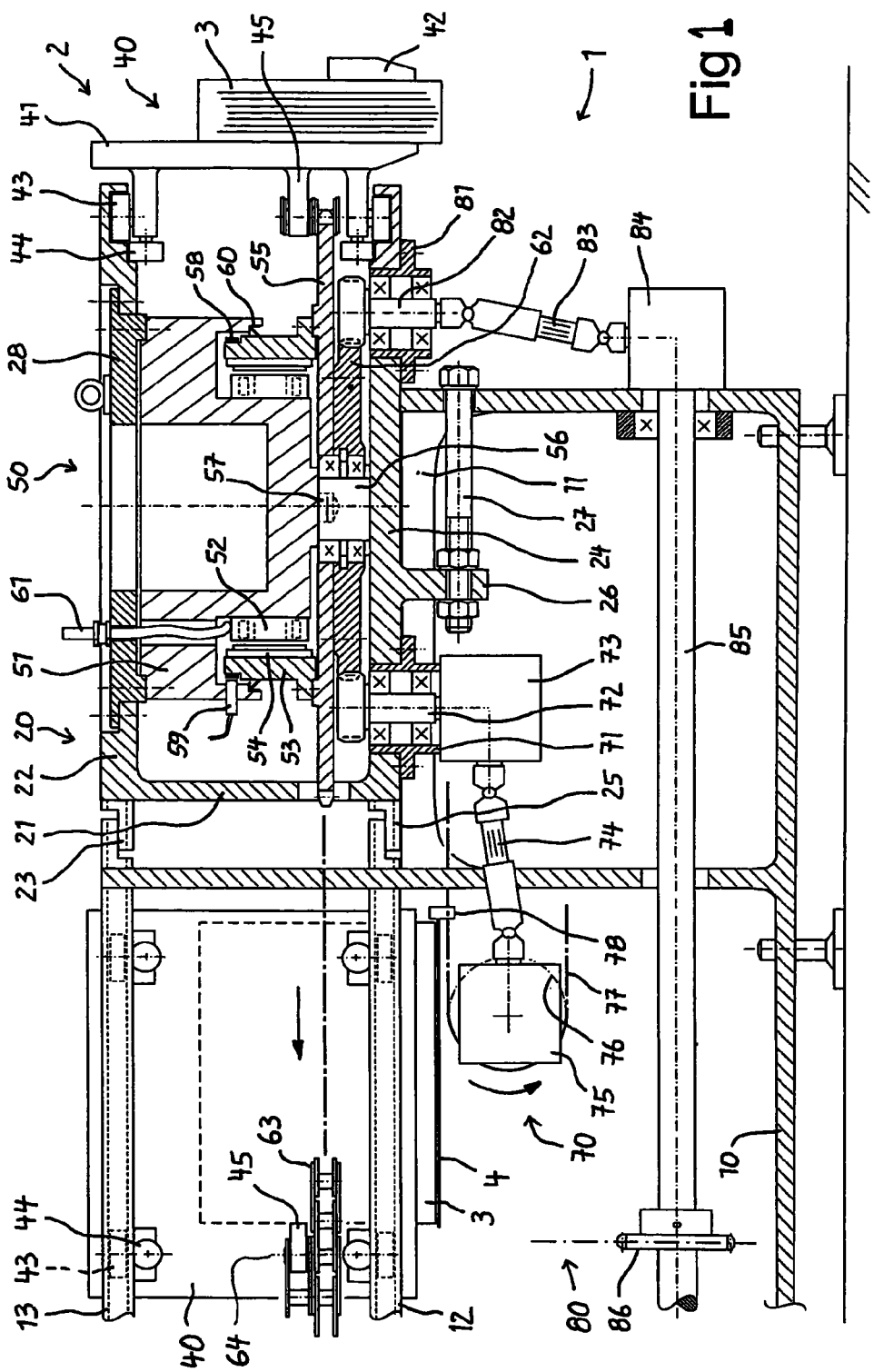
FIG. 1 shows a sectional representation of one embodiment of an inventive drive system for a transport system of a perfect binding machine.
Figure 2:
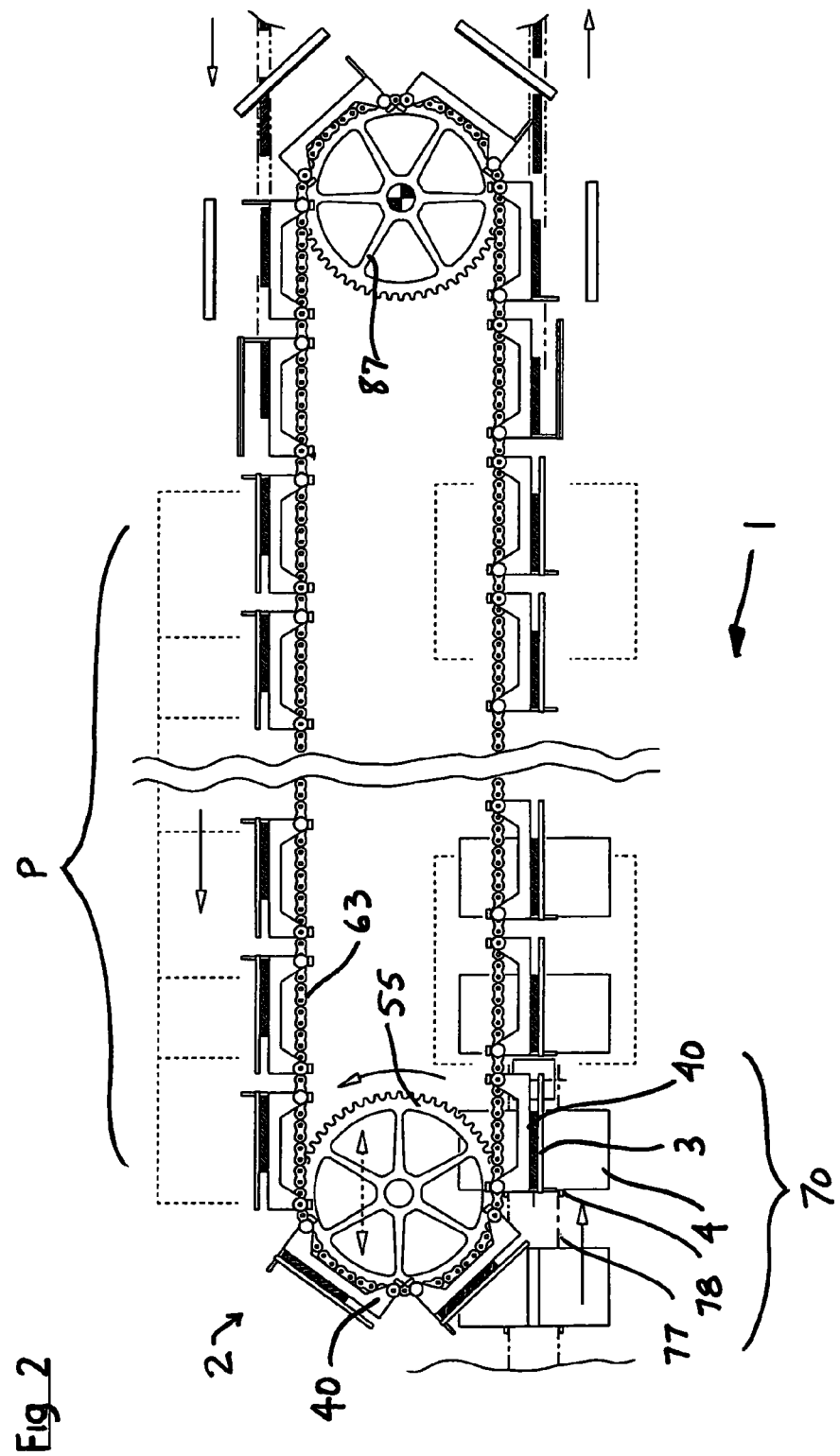
FIG. 2 shows a schematic plan view of the inventive drive system as part of the overall transport system of a perfect binding machine.

As shown in FIGS. 1 and 2, the transport system 2 of the perfect binding machine 1 features a plurality of book block clamps 40 that can be continuously moved along a closed circulation path and are coupled to a transport chain 63. The book block clamps 40 are guided in lower and upper guide rails 12, 13 of a frame 10 by means of guide and support rollers 43, 44 that are rotatably accommodated on an inner clamping jaw 41 and coupled to hinge pins 64 of the transport chain 63 by means of extension arms 45. Loosely gathered book blocks 3 can be clamped in the book block clamps 40 such that the book block spines protrude downward, namely by means of an outer clamping jaw 42 that can be moved relative to the inner clamping jaw 41.

The transport chain 63 revolves around a driving chain wheel 55 and a non-driven deflection chain wheel 87 and forms an oval circulation path together with the guide rails 12, 13. Various processing stations indicated at P may be arranged along straight sections of the circulation path.

The driving chain wheel 55 serves as a tensioning wheel and is rotatably supported in a bearing block 20 that can be displaced and fixed relative to the frame 10 on a console 11. The bearing block 20 of essentially U-shaped design features an upper and a lower limb 22, 24 that are connected to one another by means of a web 21 and respectively form an upper and a lower guide 23, 25 in the form of corresponding extensions of the guide rails 12, 13 for the book block clamps 40 that are rigidly mounted on the frame. The bearing block 20 is displaced relative to the frame 10 by means of a clamping screw 27 that engages on an extension arm 26 of the lower limb 24 in order to tension the transport chain 63.

According to the invention, the driving chain wheel 55 is driven by a gearless, rotative electric direct drive 50 (also referred to as torque motor). The driving wheel 55 itself quasi provides the driving torque for the drive of the transport chain 63. No transmission elements with inherent elasticity exist between the driving wheel 55 and the direct drive 50 such that the driving wheel 55 is not oscillatory relative to the motor axle and absolutely free of play. Due to its oversized design, the transport chain 63 represents an inherently rigid traction mechanism such that an overall absolutely rigid transport system 2 for the book block clamps 40 has been created.

A first rotating component 53 (rotor) of the direct drive 50 is directly mounted on the driving chain wheel 55 and fitted with permanent magnets 54. A second stationary component 51 (stator) is situated on a cover 28 that is recessed into the upper limb 22 and contains the magnet coils 52. The motor connecting cable 61 is permanently installed from the stationary component 51 to a motor control for the direct drive 50 that is not shown in the figure.

A dimensional representation 58 that revolves in an enclosed fashion is arranged on the rotating component 53 for the position feedback of the direct drive 50, wherein this dimensional representation is scanned by a sensor 59 arranged on the stationary component 51. The upper limb 22 resembles a flat plate with a recess for the cover 28 and together can be considered as forming the top of the receptacle for the components 51 and 53.

The driving chain wheel 55 with the first component 53 of the direct drive 50 rigidly arranged thereon is rotatably supported on a rigid axle 56 that is affixed to the lower limb 24. A pin 57 connects the stationary component 51 connected to the upper limb 22 to the axle 56 such that the open, U-shaped bearing block 20 is transformed into a closed, absolutely rigid annular body. This allows a particularly rigid support for the driving chain wheel 55. The driving wheel implements the chain tensioning action by shifting horizontally with the adjustment of the block 20. Because the axle 56 is fixed with respect to the bottom of the block, when the wheel is shifted as a result of a horizontal load transmitted from the adjustment of the block, through the axle, the wheel tensions the chain. Adjustment of the bearing block relative to the frame horizontally shifts the coaxial axes of the rotating component and the driving wheel and thereby adjusts the tension of the traction mechanism.

The direct drive 50 is not only cooled by the massive stationary component 51 that is realized in a pot-shaped fashion, but also by the bearing block 20, to which the stationary component 51 is screwed in a planar fashion. The cooling surface can be further increased by arranging corresponding ribs on the stationary component 51, on the cover 28 and/or on the bearing block 20. A forced ventilation, particularly of the interior of the direct drive 50, is not required. This direct drive is sealed by means of a seal 60 arranged on the circumference of the two components 51, 53. Soiling is also significantly reduced due to the fact that the rotative direct drive 50 is arranged above the driving chain wheel 55.

In contrast to driving motors that are arranged on the bottom in perfect binding machines according to the state of the art, adequate access to the direct drive 50 is realized in this case. For this purpose, the cover 28 with the stationary component 51 mounted thereon is detachably accommodated on the bearing block 20 and exposes an access opening that lies in the axial direction of the direct drive 50. This access opening is so large that the direct drive 50 or at least individual components 51, 53, etc., can be removed without requiring further disassembly. In the present exemplary embodiment, the stationary component 51 can be removed simultaneously with the lifting of the cover 28. This significantly simplifies the assembly/disassembly and/or the inspection of the rotative direct drive 50.

As already mentioned above, the drive and the tensioning device of the transport system 2 are integrated into one unit and act upon the same deflection wheel, namely the driving chain wheel 55. This only requires little structural space and the other non-driven deflection chain wheel can also be rotatably supported on a stationary axle in a simple frame construction.

This integrated design, in particular, makes it possible to position the drive on the end of the transport system 2, on which the cover feeding and pressing device is situated. The cover feeder 70 therefore can also be driven by the driving chain wheel 55 that is directly driven. For this purpose, a toothed wheel 62 mounted underneath the driving chain wheel 55 meshes with a pinion shaft 72 that is supported in a bearing flange 71. The tapped rotational movement is transmitted to chain wheels 76 of the cover feeder 70 via an angular gear 73, an articulated shaft 74—for the length compensation required due to the tensioning—and another angular gear 75.

The chain wheels 76 in turn drive transport chains 77 that move synchronous to the book block clamps 40 due to the drive connection with the driving chain wheel 55 of the transport system 2 and combine covers 4 with the book blocks 3 by means of correspondingly arranged pushers 78. The book blocks 3 and the covers 4 can be combined with a very high speed due to the short drive connection with the driving chain wheel 55 that defines the position of the book block clamps 40 and the fact that only the cover feeder 70 is connected to this drive tap.

According to modern drive concepts, the different functions are provided with individual drives. It is therefore also possible to merely drive the transport system 2 of the book block clamps 40 with the described rotative direct drive 50 and to provide other processing stations including the infeed and delivery devices, as well as the cover feeder 70, with one or more separate drives, wherein these drives are connected to one another by means of a common control device, in which the rotative direct drive 50 serves as master.

In order to realize a perfect binding machine 1 with a simple drive, the described rotative direct drive 50 may simultaneously serve as the drive for different processing stations or even as the main drive for the entire perfect binding machine 1. For this purpose, an additional drive tap is provided in the exemplary embodiment, wherein a pinion shaft 82 supported in a bearing flange 81 meshes with the aforementioned toothed wheel 62 and is coupled to a main shaft 85 via an articulated shaft 83 (for the length compensation required due to the tensioning) and an annular gear 84. Various processing stations can be driven by the main shaft 85. In the exemplary embodiment, a chain wheel 86 is mounted on the main shaft 85 and drives a not-shown processing station 80.

The invention claimed is:

1. A book binding machine for processing book blocks (3), having a frame (10) supporting a transport system (2) that includes a plurality of book block clamps (40) coupled to a traction mechanism (63) that continuously moves along a closed, horizontal circulation path having curved and straight sections while engaged with a revolving driving wheel (55) within one curved section and a deflection wheel (87) within the other curved section and is maintained in tension by a tensioning device, and processing stations (70, 80, P) arranged along the straight sections, wherein the improvement comprises that the driving wheel (55) is driven by a gearless, rotative electric direct drive (50) having a first, rotating component (53) directly rigidly connected to the driving wheel (55).

2. The book binding machine according to claim 1, wherein the driving wheel (55) and rotating component (53) coaxially rigidly rotate and the driving wheel (55) is supported in a bearing block (20) of the tensioning device, which can be displaced and fixed relative to the frame (10).

3. The book binding machine according to claim 1, wherein the rotative direct drive (50) is arranged above the driving wheel (55).

4. The book binding machine according to claim 2, wherein the driving wheel (55) has an axle (56) which is fixed within the bearing bock (20).

5. The book binding machine according to claim 4, wherein the bearing block (20) forms a rigid receptacle including upper and lower end plates (22, 24) containing the rotative direct drive (50) and the axle (56) of the driving wheel (55).

6. The book binding machine according to claim 2, wherein the bearing block (20) forms a rigid receptacle having a top defined by at least one of an upper plate (22) and a cover (28) and the rotative direct drive (50) is attached to and extends below said top.

7. The book binding machine according to claim 6, wherein the rotative direct drive (50) is arranged between the driving wheel (55) and said top.

8. The book binding machine according to claim 6, wherein a second, stationary component (51) of the rotative direct drive (50) is rigidly supported by said top.

9. The book binding machine according to claim 6, wherein at least some of the top is detachable in order to form an access opening in the axial direction of the direct drive (50) for removing the first (51) and second (53) components of the direct drive (50).

10. The book binding machine according to claim 4, wherein the driving wheel (55) is rotatably supported on a non-rotative axle (56).

11. The book binding machine according to claim 1, wherein the first rotating component (53) of the rotative direct drive (50) is fitted with permanent magnets (54).

12. The book binding machine according to claim 1, wherein at least one processing station (70, 80, P) is driven by the driving wheel (55).

13. The book binding machine according to claim 12, wherein a main shaft (85) is operatively connected to the driving wheel (55) by an articulated shaft (83) and a plurality processing stations (80) are driven by the main shaft.

14. The book binding machine according claim 1, wherein the machine includes a cover feeding and pressing device (70) and the driving wheel (55) is arranged adjacent to the cover feeding and pressing device (70).

15. A book binding machine for processing book blocks (3), comprising: (a) a frame (10); (b) a transport system (2) supported by the frame, including a plurality of book block clamps (40) coupled to a traction mechanism (63) that continuously moves along a closed, horizontal circulation path having curved and straight sections; (c) a driving wheel (55) horizontally revolving about a vertical axis and engaging the traction mechanism (63) within one curved section and a non-driven deflection wheel engaging the traction mechanism within another other curved section; (d) a plurality of processing stations (70, 80, P) arranged along the straight sections; (e) a bearing block fixed in horizontally adjustable positions relative to the frame; and (f) an electric direct drive (50) fixed within the bearing block and having a rotating component (53) directly connected to and coaxial with the driving wheel (55); whereby adjustment of the bearing block relative to the frame horizontally shifts the coaxial axes of the rotating component and the driving wheel and thereby adjusts the tension of the traction mechanism.

16. The book binding machine according to claim 15, wherein the bearing block (20) forms a receptacle having a top (22) and a bottom (24), the electric drive is fixed within the receptacle above the bottom (24), the driving wheel (55) is situated at least in part within the receptacle between the electric drive (50) and the bottom (24) around an axle (56) in the receptacle, and the rotating component (53) of the direct drive (50) is rigidly connected to the driving wheel (55) radially outward from the axle (56).

17. The book binding machine according to claim 16, wherein the axle (56) rigidly extends vertically between the electric drive and the bottom of the receptacle and the driving wheel closely conforms to and rotates around the axle.

18. The book binding machine of claim 16, wherein the traction mechanism is a chain and the driving wheel (55) extends horizontally outside the bearing block to engage the chain.

19. The book binding machine of claim 16, wherein the direct drive has a stationary component (51) fixed with respect to the bearing block and magnetically coupled to the rotating component (53) which is rigidly connected to the driving wheel (55), and the axle rigidly extends from the stationary component.

20. The book binding machine according to claim 1, wherein at least one processing station (70, 80) is driven by an articulated shaft rotated by a toothed wheel (62) rigidly connected to the drive wheel (55) in the bearing block.

21. A book binding machine for processing book blocks (3), comprising: (a) a frame (10); (b) a transport system (2) supported by the frame, including a plurality of book block clamps (40) coupled to a traction mechanism (63) that has an effective mass continuously moving along a closed, horizontal circulation path which has curved and straight sections; (c) a driving wheel (55) horizontally revolving about a vertical axis and engaging the traction mechanism (63) within one curved section and a non-driven deflection wheel engaging the traction mechanism within another other curved section; (d) a plurality of processing stations (70, 80, P) arranged along the straight sections; (e) a bearing block (20) fixed in horizontally adjustable positions relative to the frame; and (f) an electric direct drive motor (50) fixed within the bearing block and having a rotating component (53) rigidly connected to and coaxial with the driving wheel (55); wherein at each of said horizontally adjustable positions of the bearing block, the driving wheel (55) and rotating component (53) coaxially rigidly rotate, thereby providing a rigid connection between the direct drive motor (50) and the mass of the traction mechanism (63).

* * * * *